United States Patent
Bender et al.

(10) Patent No.: US 10,810,998 B2
(45) Date of Patent: Oct. 20, 2020

(54) CUSTOM TEMPORAL BLACKLISTING OF COMMANDS FROM A LISTENING DEVICE

(71) Applicant: International Business Machines Corporation, Armonk, NY (US)

(72) Inventors: Michael Bender, Rye Brook, NY (US); Kulvir S. Bhogal, Fort Worth, TX (US); Jeremy R. Fox, Goergetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/146,428

(22) Filed: Sep. 28, 2018

(65) Prior Publication Data

US 2020/0105249 A1    Apr. 2, 2020

(51) Int. Cl.
| | | |
|---|---|---|
| *G10L 15/08* | (2006.01) | |
| *G10L 15/22* | (2006.01) | |
| *G06F 16/9535* | (2019.01) | |

(52) U.S. Cl.
CPC .......... *G10L 15/08* (2013.01); *G06F 16/9535* (2019.01); *G10L 15/22* (2013.01); *G10L 2015/088* (2013.01); *G10L 2015/228* (2013.01)

(58) Field of Classification Search
CPC ... G10L 15/08; G10L 15/22; G10L 2015/088; G10L 2015/228; G06F 16/9535
See application file for complete search history.

(56) References Cited

U.S. PATENT DOCUMENTS

| | | |
|---|---|---|
| 5,899,972 A | 5/1999 | Miyazawa et al. |
| 7,882,032 B1 | 2/2011 | Hoffman |
| 9,548,053 B1 * | 1/2017 | Basye ................... G06F 16/683 |
| 9,691,378 B1 | 6/2017 | Meyers et al. |
| 9,728,188 B1 | 8/2017 | Rosen |
| 2003/0216919 A1 | 11/2003 | Roushar |
| 2008/0091426 A1 | 4/2008 | Rempel et al. |
| 2008/0301135 A1 | 12/2008 | Alves et al. |
| 2011/0258560 A1 * | 10/2011 | Mercuri ................ G06F 16/958 715/753 |
| 2014/0179360 A1 * | 6/2014 | Jackson .................. H04W 4/14 455/466 |
| 2014/0278435 A1 | 9/2014 | Ganong et al. |
| 2018/0189857 A1 * | 7/2018 | Wu ..................... G06Q 30/0631 |
| 2018/0192127 A1 * | 7/2018 | Sirpal ............. H04N 21/44222 |
| 2018/0218079 A1 * | 8/2018 | Li ......................... G06F 40/242 |

(Continued)

FOREIGN PATENT DOCUMENTS

CN     107426154     * 12/2017 .......... H04L 63/101

OTHER PUBLICATIONS

Machine English translation of CN107426154 (Year: 2017).*

(Continued)

*Primary Examiner* — Michelle M Koeth
(74) *Attorney, Agent, or Firm* — Marcus Walker (57) ABSTRACT

Aspects of the present invention disclose a method for creating a blacklist of keywords. The method includes one or more processors identifying an indication of content. The method further includes determining at least one keyword included in the content. The method further includes generating a blacklist that corresponds to the content, where the generated blacklist including the determined at least one keyword.

17 Claims, 4 Drawing Sheets

(56) References Cited

U.S. PATENT DOCUMENTS

2018/0330728 A1* 11/2018 Gruenstein ............. G10L 15/22

OTHER PUBLICATIONS

Scrivens, "Google Assistant 'routines' will soon let you personalize multiple actions you can trigger with a single command", Oct. 5, 2017, 8 pps., https://www.androidpolice.com/2017/10/05/google-assistant-routines-now-let-personalize-multiple-actions-trigger-single-command/.

Vincent, "Inaudible ultrasound commands can be used to secretly control Siri, Alexa, and Google Now", Sep. 7, 2017, 3 pps., https://www.theverge.com/2017/9/7/16265906/ultrasound-hack-siri-alexa-google.

Komondo, "How to listen to everything Amazon Echo has ever heard", Apr. 15, 2017, 6 pps., http://www.foxnews.com/tech/2017/04/15/how-to-listen-to-everything-amazon-echo-has-ever-heard.html.

Lanaira, "This is Amazon's Solution to Keep Alexa From Waking Up When the TV Says Its Name", Feb. 4, 2018, 4 pps., http://www.techtimes.com/articles/220323/20180204/this-is-amazons-solution-to-keep-alexa-from-waking-up-when-the-tv-says-its-name.htm.

Fingas, "Alexa will stay calm during Amazon's Super Bowl ad. Amazon is using clever tech tricks to prevent any rude surprises", Feb. 2, 2018, 2 pps., https://www.engadget.com/2018/02/02/amazon-super-bowl-ad-wont-trigger-echo/.

Bloomberg et al., "Why Your Echo Won't Perk Up During Amazon's Super Bowl Ad", Feb. 3, 2018, Fortune, 2 pps., http://fortune.com/2018/02/03/alexa-super-bowl-ad/.

* cited by examiner

CUSTOM TEMPORAL BLACKLISTING OF COMMANDS FROM A LISTENING DEVICE

BACKGROUND OF THE INVENTION

The present invention relates generally to the field of mobile devices, and more particularly to blocking commands to listening devices.

In recent years, developments in digital assistants and the growth of Internet of Things (IoT) capable devices have created competition to introduce new voice interfaces (e.g., for smart speakers, virtual assistance hardware/software, etc.). The IoT is a network of physical devices embedded with electronics, software, sensors, and connectivity which enables these devices to connect and exchange data with computer-based systems. Technology is embedded in IoT-enabled devices that allow these devices to communicate, interact, be monitored, and controlled over the Internet.

A command is an instruction given by a user telling a device to perform a specific task. Digital assistants receive commands from a user in either text-based or spoken form. As the popularity of the latter form has grown, so has the demand to implement more meaningful and useful commands. A user can use commands to control the lighting in a home, transfer money, or buy products online. However, a common issue amongst IoT devices is the lack of ability to refrain from performing a task associated with a command embedded in multimedia.

Blacklisting is the act of adding commands to a list that are unacceptable, avoided, or distrusted by the creator of the list. In certain situations, a user adds a command to a blacklist for only a limited amount of time to prevent the permanent banning of commands from use. Blacklists prevent a device from performing a specific task associated with a particular command.

SUMMARY

Aspects of the present invention disclose a method, computer program product, and system. The method includes one or more processors identifying an indication of content. The method further includes one or more processors determining at least one keyword included in the content. The method further includes one or more processors generating a blacklist that corresponds to the content, the generated blacklist including the determined at least one keyword. Embodiments of the present invention extract data from content that a user accesses, as opposed to ingesting vast possible feeds, to reduce the amount of processing and network resources required to generate a blacklist.

Additionally, one aspect of the present invention discloses a method, computer program product, and system for determining at least one keyword included in the content. The method includes one or more processors identifying at least one trigger word in the content that corresponds to a wake-up command of a listening device. The method further includes one or more processors identifying words adjacent to the trigger word. The method further includes one or more processors determining the at least one keyword included in the content based on the trigger word in the content and the identified words adjacent to the trigger word in the content. Embodiments of the present invention reduce the amount of processing resources needed to derive keywords by analyzing data that is interrelated with trigger words as opposed to all of the data included in the accessed content.

Additionally, another aspect of the present invention discloses a method, computer program product, and system for sending the blacklist the blacklist of keywords to a listening device. The method includes one or more processors sending the generated blacklist to the listening device. Embodiments of the present invention reduce the amount of network resources needed to transmit by reducing the amount of data included in a blacklist file.

DETAILED DESCRIPTION

Embodiments of the present invention allow for a device (e.g., smart speaker) to ignore commands embedded in content identified by a user (e.g., content that the user is preparing to listen to, is listening to, etc.). Embodiments of the invention determine keywords while analyzing the content identified by the user and generates a custom blacklist corresponding to the content. The determined keywords are words or phrases associated with commands that correspond to initiating the performance of a specific task. The custom blacklist enables a device to disregard commands embedded in the content for a period of time (i.e., while the content is running). The custom blacklist is removed upon the expiration of a period of time (i.e., the keywords are removed from the device when the content stops running).

Some embodiments of the present invention recognize that devices do not differentiate a command of a user from commands embedded in media (e.g., a song, commercial, etc.). Consequently, commands embedded in content create scenarios where a device is performing undesirable actions in response to false commands embedded in content. For example, a device in range of the television, which plays a prerecorded show with commercials that includes a "buy now" command, can receive the command and the device falsely reacts to the command. Some embodiments of the present invention overcome this challenge through utilization of natural language processing (NLP) and cognitive analysis to derive a command from data a user accesses, and then add the command to a blacklist file. Various embodiments of the present invention utilize personal temporal blacklist based on known sources of content to prevent a device from reacting falsely to commands.

Embodiments of the present invention recognize that challenges exist in the process of ingesting all possible feeds to fill a blacklist. A computing device that is ingesting vast possible feeds would expend a considerable portion of processing and network resources extracting data to create an expansive blacklist of trigger words that may not correspond to the content the device receives. Some embodiments of the present invention overcome this challenge by monitoring applications of devices of a user for indications that the user is accessing content. Additionally, embodiments of the present invention overcome these challenges by creating a personal temporal based blacklist, which is composed of keywords derived from known sources of content the user is accessing. For example, embodiments of the present invention reduce the amount of processing resources needed to derive keywords by analyzing data that is interrelated with trigger words as opposed to all the data included in the accessed content. In various embodiments of the present invention provide improvements of reducing the amount of network and storage resources expended by only sending packets associated with keywords and removing the blacklist once the content is no longer being accessed by the user. For example, embodiments of the present invention extract data from content that a user accesses as opposed to ingesting vast possible feeds to reduce the amount of processing and network resources required to generate a blacklist.

Implementation of embodiments of the invention may take a variety of forms, and exemplary implementation details are discussed subsequently with reference to the Figures.

Figure 1:
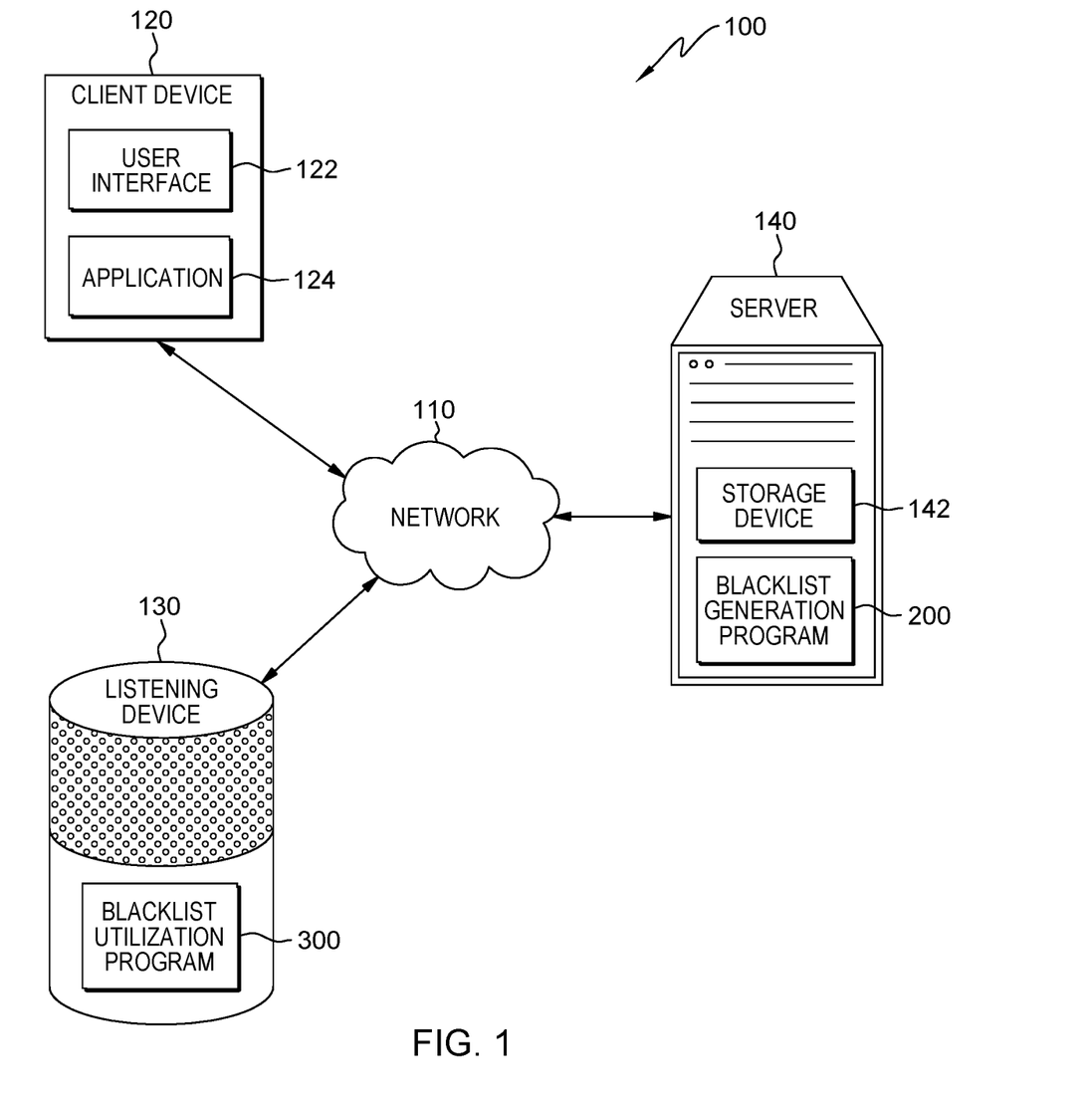
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120, listening device 130, and server 140, all interconnected over network 110. In one embodiment, client device 120, listening device 130, and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120, listening device 130, and server 140, in accordance with embodiments of the present invention. For example, a smart speaker (e.g., listening device 130) and a server (e.g., server 140) receive a video that a user accesses using a laptop (e.g., client device 120) over the Internet.

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 4, in accordance with embodiments of the present invention.

Client device 120 includes user interface 122 and application 124. User interface 122 is a program that provides an interface between a user of client device 120 and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access content. For example, application 124 is a web browser of a personal computer that a user can utilize to access videos on a website. In another embodiment, a user utilizes application 124 of client device 120 to access content stored in client device 120. For example, application 124 is a DVR software program of a media player that a user can utilize to call up a recorded television program. In another example, application 124 is media playing software that a user can utilize to play a digital video disc (DVD) the user inputs into a media player.

In various embodiments of the present invention, listening device 130 may be a smart speaker, or any other device capable of executing computer readable program instructions, in accordance with embodiments of the present invention. Listening device 130 includes speakers, a processor, a microphone, and/or blacklist utilization program 300. In various embodiments of the present invention, a user utilizes listening device 130 to play audio, receive commands, perform task, communicate with other IoT-enabled devices, and communicate with other users. In one embodiment, a user states a command that listening device 130 receives and performs the task associated with the command. For example, a user states a trigger word that a microphone of a smart speaker detects and correlates to a command associated with a specific task. In another embodiment, listening device 130 communicates with client device 120 to perform a task associated with a command of a user. For example, a digital assistant of a smart speaker calls up a movie on a DVR of a smart television (e.g. client device 120) into queue in response to a command to play a movie from a user.

Blacklist utilization program 300 utilizes a blacklist file created by blacklist generation program 200 to ignore commands detected in the operating environment of a listening device 130. For example, blacklist utilization program 300 uses a microphone of a smart speaker (e.g., listening device 130) to detect a keyword in the operating environment of the smart speaker and prohibits the smart speaker from performing a specific task corresponding to the keyword. In another example, blacklist utilization program 300 uses the microphone of a smart speaker to continuously monitor the operating environment of the smart speaker until initiated content is no longer present in the operating environment of the smart speaker. In yet another example, blacklist utilization program 300 removes a blacklist file from a smart speaker in response to detecting initiated content is no longer present in the operating environment of the smart speaker.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100 (e.g., client device 120). In general, server 140 is representative of any electronic device or combination of electronic devices capable of executing computer readable program instructions. Server 140 may include components as depicted and described in further detail with respect to FIG. 4, in accordance with embodiments of the present invention.

Server 140 includes storage device 142 and blacklist generation program 200. Storage device 142 can be implemented with any type of storage device, for example, persistent storage 405, which is capable of storing data that may be accessed and utilized by server 140, client device 120, and listening device 130, such as a database server, a hard disk drive, or a flash memory. In one embodiment, in response to receiving an indication of content, blacklist generation program 200 retrieves information associated with the content (e.g., a transcript of the content, a copy of the content from client device 120, etc.). For example, blacklist generation program 200 detects that a user puts a DVD into a media player, retrieves data associated with the DVD, and stores the data associated with the DVD on a server. In another example, blacklist generation program 200 detects a user logging into a video search engine account on a personal computer and entering a search query that returns a list of content, which blacklist generation program 200 retrieves and stores on a server. In another embodiment, listening device 130 accesses server 140 to retrieve data that blacklist generation program 200 creates and stores in storage device 142. For example, a smart speaker accesses a server to retrieve of a custom blacklist from memory that blacklist generation program 200 created.

Blacklist generation program 200 creates custom temporal-based blacklists of keywords using pre-scanned content that a user accesses using client device 120 via network 110. For example, blacklist generation program 200 can scan content of a Uniform Resource Locator (URL) returned in response to a video search query of a user, for a keyword associated with a command that listening device 130 utilizes to perform a specific task. Blacklist generation program 200 can then create a custom blacklist of keywords that correspond to the content of the video. Additionally, blacklist generation program 200 can send the custom blacklist to listening device 130. In another example, blacklist generation program 200 can store the custom blacklist in an account that is linked to listening device 130.

Figure 2:
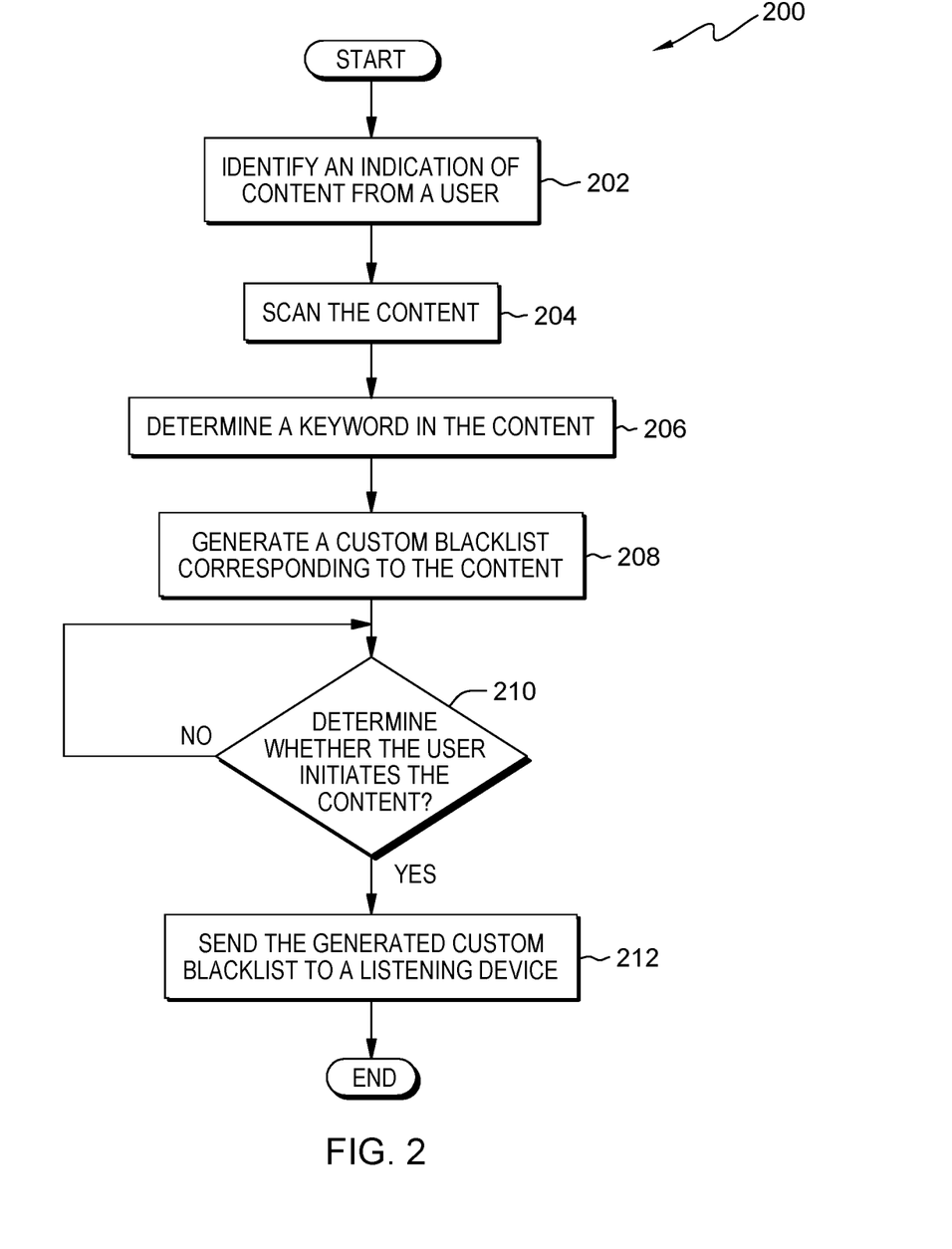
FIG. 2 is a flowchart depicting operational steps of a program for creating a custom blacklist of keywords derived from an indicated piece of content, which can be utilized over a defined period of time, in accordance with embodiments of the present invention.

FIG. 2 is a flowchart depicting operational steps of blacklist generation program 200, a program for creating a custom blacklist of keywords derived from an indicated piece of content, which can be utilized over a defined period of time, in accordance with embodiments of the present invention. In one embodiment, blacklist generation program 200 initiates in response to linking blacklist generation program 200, client device 120, and listening device 130 over network 110. For example, a user creates an account on a server for a customized blacklist, and blacklist generation program 200 monitors a laptop (e.g., client device 120) and a smart speaker (e.g., listening device 130) that the user adds to the account.

In step 202, blacklist generation program 200 identifies an indication of content from a user. In one embodiment, blacklist generation program 200 identifies a user is accessing content on client device 120. For example, blacklist generation program 200 monitors a laptop of a user, detects that the user is using a web browser (e.g., application 124) of the laptop to initiate a search query for a product demonstration video, and determines that the user is providing an indication to access content. In another example, blacklist generation program 200 monitors a Digital Video Disc (DVD) player of a user, detects that the user is loading a movie into the DVD player (e.g., client device 120), and determines that the user is providing an indication to access content. In yet another example, blacklist generation program 200 monitors a user interface of a Digital Video Recorder (DVR), detects that user is requesting a sitcom episode stored on the DVR (e.g., client device 120), and determines that the user is providing an indication to access content.

In step 204, blacklist generation program 200 scans the content indicated by the user. In various embodiments of the present invention blacklist generation program 200 preprocesses the content the user accesses to determine which types of data are available (e.g., audio, images, and/or closed captioning transcripts, etc.) to utilize in deriving keywords. In one embodiment, blacklist generation program 200 receives the content from client device 120, preprocesses the content associated with the indication by the user, and stores the content in storage device 142. In another example, a DVD player of the user sends the audio, images, and/or closed captioning transcripts of a DVD to a server (e.g., server 140) where blacklist generation program 200 determines a data type for efficiently determining keywords (i.e., determining which data type can conserve computing, storage, and network resources) and stores the data file on the server.

In another embodiment, in response to identifying an indication of content, blacklist generation program 200 retrieves the indicated content (e.g., from client device 120 or a network accessible storage location), preprocesses the content, and stores the retrieved content in storage device 142. For example, blacklist generation program 200 monitors a user interface of a computer (e.g., client device 120) and detects the user is entering a search query for a product demonstration video after the user logs into an online search account that is linked to a server (e.g., server 140). Blacklist generation program 200 retrieves a list of video links returned in response to the search query from the computer and examines the product demonstration video of each link of the list to determine types of data (e.g., audio, images, and/or closed captioning transcripts, etc.) that can be utilized to determine keywords. Additionally, blacklist generation program 200 stores the product demonstration videos and corresponding preprocessing data on storage device 142 of server 140.

In step 206, blacklist generation program 200 determines a keyword in the content. In various embodiments of the present invention, blacklist generation program 200 utilizes Natural Language Processing (NLP) to identify trigger words and analyze content and data derived from scanning the content (from step 204) to determine keywords. In one embodiment, a user defines the trigger word included in a user profile of listening device 130. For example, a user modifies a factory trigger word of a default profile of a smart speaker so that the smart speaker "wakes up" in response to the name "Mary" instead of the factory trigger word. In another embodiment, blacklist generation program 200 retrieves a default profile of listening device 130 to derive keywords and trigger word, analyzes the content stored in storage device 142 (e.g., a stored instance of the content, data derived from scanning the content in step 204, information associated with the content, etc.) based on the default profile of listening device 130, and identifies corresponding keywords in the content. For example, blacklist generation program 200 retrieves a default profile of a smart speaker that includes factory trigger words and keywords, analyzes a preprocessed audio file stored on a server utilizing NLP (e.g., speech recognition).

Additionally, blacklist generation program 200 detects the factory trigger word included in the preprocessed audio file and utilizes NLP (e.g., parsing) to analyze the content proximate to the factory trigger word for commands (i.e., a keyword). In another example, blacklist generation program 200 analyzes a video file stored on a server (e.g., server 140) that includes embedded close captioning text utilizing NLP (e.g., optical character recognition) to detect a trigger word (e.g., Mary) included in the video file. In yet another example, blacklist generation program 200 identifies the phrase "order a pizza" proximate to the trigger word "Mary" and using the smart speaker profile determines that the phrase "order a pizza" includes a keyword (e.g., order, order a pizza, etc.). In another embodiment, blacklist generation program 200 uses a default profile of listening device 130 and derives multiple keywords included the content. For example, blacklist generation program 200 uses the default profile of a smart speaker to derive commands (e.g., keywords), identifies a phrase "Mary order a pizza. Did Mary buy a pizza?" in the audio data of the preprocessed content. In this example, blacklist generation program 200 determines that the content includes multiple keywords and accordingly determines the plurality of keywords included in the phrase (e.g., Mary, order, order a pizza, buy, buy a pizza, etc.).

In step 208, blacklist generation program 200 generates a custom blacklist corresponding to the content. In various embodiments of the present invention, blacklist generation program 200 adds time limitations (i.e., a defined timeframe for which a blacklist file is active) on the use of a blacklist file that blacklist generation program 200 generates. In example embodiments, blacklist file is a profile utilized by listening device 130 that includes a list of commands (e.g., keywords) barred from execution on listening device 130 because the keywords result in undesirable actions by listening device 130. For example, blacklist generation program 200 generates a blacklist file that a smart speaker uses to block the commands buy, order, buy a pizza, and order a pizza. In another example, blacklist generation program 200 generates a blacklist file for each link in the web browser (e.g., application 124) that is returned in response to the search query of the user for a product demonstration video.

In another embodiment, blacklist generation program 200 adds the determined keyword (from step 206) to a blacklist file (i.e., augments an existing blacklist file), which corresponds to the content that includes the determined keyword, and stores the blacklist file in storage device 142. For example, blacklist generation program 200 adds "order a pizza" and other determined keywords to a blacklist file, which blacklist generation program 200 has identified in the audio file of the first link on the list returned in response to the search query of the user, and stores the blacklist file on a server (e.g., on storage device 142 of server 140).

In another embodiment, blacklist generation program 200 accesses storage device 142 to retrieve keywords (determined in step 206) corresponding to an indicated piece of content. In this scenario, blacklist generation program 200 adds the retrieved keywords to a text file and stores the text file in storage device 142. For example, blacklist generation program 200 retrieves keywords (e.g., order, order a pizza, buy, buy a pizza, etc.). Blacklist generation program 200 then adds the retrieved keywords to a text file and stores the text file in a database for blacklist files (e.g., a cloud account that links listening device 130 and blacklist generation program 200).

In another embodiment, blacklist generation program 200 adds a default time limitation to a blacklist file. For example, blacklist generation program 200 adds a one hour time restriction on the use of a blacklist file that corresponds to the content. In additional embodiments, blacklist generation program 200 adds a user-defined time limitation to a blacklist file. For example, a user provides a two-hour preference for use of a blacklist file. Accordingly, blacklist generation program 200 adds a two-hour time restriction on the use of the blacklist file that corresponds to the content. In yet another embodiment, blacklist generation program 200 generates time limitations dynamically. For example, blacklist generation program 200 uses metadata of an audio file of the content to determine the length of the audio file and adds a time restriction to the blacklist file that corresponds to the length of the content.

In decision step 210, blacklist generation program 200 determines whether the user initiates the content. In one embodiment, blacklist generation program 200 monitors client device 120 to determine whether the user utilizes user interface 122 to initiate the content the user indicated (in step 202). For example, blacklist generation program 200 monitors user interface 122 of a laptop (e.g., client device 120) to determine whether the user interacts with the play icon in a web browser (e.g., application 124) displaying a product demonstration video of a link the user selects from the list (previously discussed with regard to step 204). In another example, blacklist generation program 200 monitors a user interface of a DVR (e.g., client device 120) to detect whether DVR receives an input from the user to play the movie (previously discussed with regard to step 204).

If blacklist generation program 200 determines that the user is not initiating the content (decision step 210, "NO" branch), then blacklist generation program 200 continues to monitor user interface 122 for initiation of the content in application 124. For example, if blacklist generation program 200 determines that the user is not initiating the audio file of the product video demonstration, then blacklist generation program 200 continues to monitor user interface 122 of the laptop (e.g., client device 120) for the user to interact with the play icon in the web browser (e.g. application 124). In another example, if blacklist generation program 200 determines that the user is requesting a different movie from the DVR, then blacklist generation program 200 continues to monitor user interface 122 of the DVR (e.g., client device 120) for the user to initiate the different movie.

In step 212, blacklist generation program 200 sends the generated blacklist to a listening device. More specifically, in response to determining that the user initiates the identified content (decision step 210, "YES" branch), blacklist generation program 200 sends the generated blacklist, which corresponds to the indicated content (of step 202), to listening device 130. For example, when blacklist generation program 200 determines that the user initiates the product demonstration video, then blacklist generation program 200 sends the blacklist file to a smart speaker. In one embodiment, blacklist generation program 200 sends the blacklist file to listening device 130 over network 110. For example, blacklist generation program 200 sends the blacklist file to a smart speaker (e.g., listening device 130) that can augment or replace a blacklist file currently on the smart speaker and utilize the blacklist file to ignore commands of the initiated content (of decision step 210). In an additional embodiment, blacklist generation program 200 can send the generated blacklist (from step 208) to listening device 130 in response to receiving a request and or command from listening device 130.

In another embodiment, blacklist generation program 200 sends packets that include keywords to listening device 130 to utilize in ignoring commands. For example, blacklist generation program 200 sends a blacklist file (e.g., a text file including only keywords) that corresponds to the initiated content to a smart speaker over a wireless local area network (WLAN). Additionally, various embodiments of the present invention provide advantages that include eliminating the need for an expansive blacklist and decreasing the amount of network resources utilized by transmitting only the blacklist file that corresponds to the initiated content. In yet another embodiment, blacklist generation program 200 can assist in the conservation of storage resources. For example, blacklist generation program 200 adds time limitations to a blacklist file that removes the blacklist file from storage upon expiration of the time limit, increasing the amount of storage resources available for use. In another example, blacklist generation program 200 reduces the amount of computing and storage resources by processing indicated pieces of content instead of ingesting vast sources of content.

Figure 3:
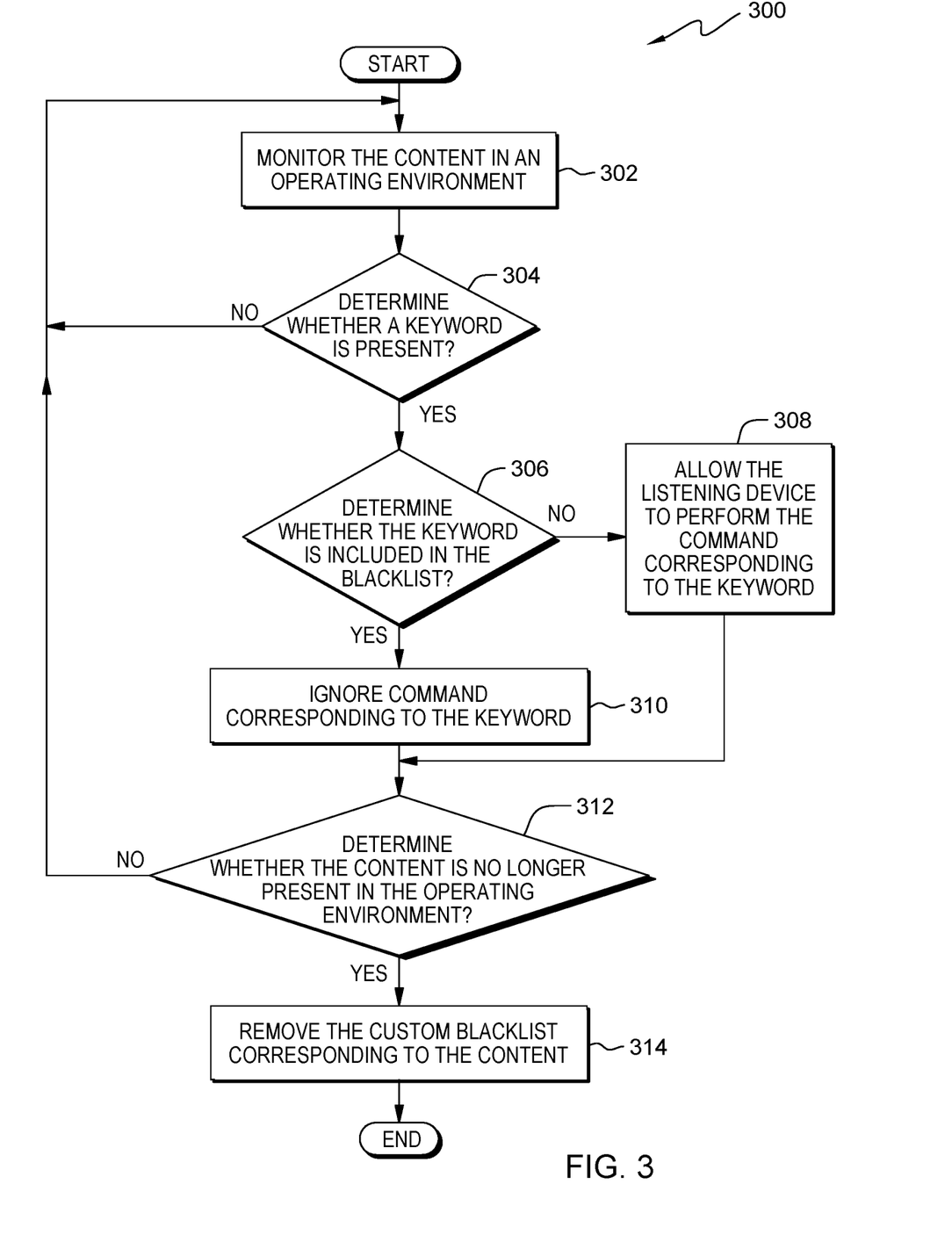
FIG. 3 is a flowchart depicting operational steps of a program for monitoring an operating environment of a listening device in order to ignore false commands, in accordance with embodiments of the present invention.

FIG. 3 is a flowchart depicting operational steps of blacklist utilization program 300, monitoring an operating environment of a listening device in order to ignore false commands, in accordance with embodiments of the present invention. In an example embodiment, blacklist utilization program 300 initiates in response to blacklist generation program 200 sending a black list file to listening device 130. In various embodiments, blacklist utilization program 300 initiates in response to determining that the user has initiated the content (i.e., in response to decision step 210 of blacklist generation program 200).

In step 302, blacklist utilization program 300 monitors initiated content in an operating environment. In one embodiment, blacklist utilization program 300 monitors an operating environment of listening device 130 for initiated content. For example, blacklist utilization program 300 utilizes the microphone of a smart speaker to detect audio of initiated content in an operating environment (i.e., the area surrounding the smart speaker) of the smart speaker.

In decision step 304, blacklist utilization program 300 determines whether a keyword is present in the operating environment. In various embodiments of the present invention, blacklist utilization program 300 utilizes NLP to determine whether a keyword is present in the operating environment of a listening device. In one embodiment, blacklist utilization program 300 uses a microphone of listening device 130 to receive audio from the operating environment of listening device 130 and utilizes NLP to determine whether a keyword of the blacklist file matches any words included in the initiated content in the operating environment of listening device 130. For example, blacklist utilization program 300 uses a microphone of a smart speaker to monitor audio in the operating environment of a smart speaker, utilizes NLP (e.g., speech recognition) to derive a textual representation of the audio detected, and determines whether the textual representation of the audio includes a keyword that is included in the blacklist file.

If blacklist utilization program 300 determines that a keyword is not present in the operating environment (decision step 304, "NO" branch), then blacklist utilization program 300 returns to step 302 to continuously monitor the initiated content in the operating environment of listening device 130. For example, if blacklist utilization program 300 detects no keywords in the operating environment of the smart speaker (e.g., listening device 130) from the audio of the product video demo playing on the laptop (e.g., client device 120) of the user, then blacklist utilization program 300 continues to monitor the audio of the product video demo in the operating environment of the smart speaker.

In decision step 306, blacklist utilization program 300 determines whether the keyword is included in the blacklist file. More specifically, in response to blacklist utilization program 300 determining a keyword is present in the operating environment of listening device 130, blacklist utilization program 300 utilizes NLP to scan the text of the blacklist file (from step 212) included in listening device 130 for a matching textual representation of the keyword present in the operating environment of listening device 130. For example, blacklist utilization program 300 detects the phrase "Mary, order a pizza" using the microphone of a smart speaker, and uses NLP to derive text from the audio including the phrase, and scans text of the blacklist file of the smart speaker for a matching blacklisted keyword.

If blacklist utilization program 300 determines that the keyword is not included in the blacklist file (decision step 306, "NO" branch), then blacklist utilization program 300 will not prohibit listening device 130 from performing the command corresponding to the keyword. For example, if blacklist utilization program 300 scans the text of the blacklist file of the smart speaker for the phrase "Play music in all rooms" (e.g., the keyword) and does not identify text that matches the phrase in the blacklist file, then blacklist utilization program 300 allows the smart speaker to perform the command corresponding to the keyword (i.e., play music in all rooms).

In step 308, blacklist utilization program 300 allows the listening device to perform the command corresponding to the keyword. In one embodiment, in response to blacklist utilization program 300 determining that the keyword present in the operating environment of listening device 130 is not present on the blacklist file of listening device 130, blacklist utilization program 300 allows listening device 130 to perform the command corresponding with the keyword. For example, blacklist utilization program 300 detects the phrase "Play music in all rooms" using a microphone of a smart speaker and allows the smart speaker to play audio on all devices connected to the smart speaker via LAN.

In step 310, blacklist utilization program 300 ignores a command corresponding to the keyword. More specifically, in response to determining that the keyword detected in the operating environment of listening device 130 (decision step 304, "YES" branch) is included in the blacklist file (decision step 306, "YES" branch), blacklist utilization program 300 prohibits performance of the task that corresponds to the keyword detected in step 304. For example, if blacklist utilization program 300 detects the blacklisted keyword "Play music in all rooms" during a product demonstration video, then the smart speaker ignores the command corresponding to the keyword (i.e., the smart speaker does not run the task corresponding to the command on associated devices). In another example, if blacklist utilization program 300 detects the keyword "order" using the microphone of a smart speaker (e.g., listening device 130), then blacklist utilization program 300 determines that the keyword "order"

is included in the blacklist file, and prohibits the smart speaker from ordering a pizza when the phrase "Mary, order a pizza" is detected.

In decision step 312, blacklist utilization program 300 determines whether the content is no longer present in the operating environment. In one embodiment, blacklist utilization program 300 utilizes a microphone of listening device 130 to determine whether the initiated content of client device 120 is present in the operating environment of listening device 130. For example, blacklist utilization program 300 uses a microphone of a smart speaker to detect whether the audio of the product demonstration video is running within range (i.e., the operating environment) of the smart speaker. In another embodiment, blacklist utilization program 300 monitors client device 120 to determine whether the content of client device 120 is present in the operating environment of listening device 130. For example, blacklist utilization program 300 monitors an application of a DVD player (e.g., client device 120) to detect whether the DVD player is executing the play command with a DVD loaded into the DVD player.

In response to determining that the initiated content is present in the operating environment of listening device 130 (decision step 308, "NO" branch), blacklist utilization program 300 returns to step 302 to continue to monitor the initiated content present in the operating environment of listening device 130. In one embodiment, blacklist utilization program 300 continues to monitor the initiated content in the operating environment of listening device 130 to detect keywords and ignore commands corresponding to keywords. For example, blacklist utilization program 300 continues to monitor the audio of the product demonstration video within range of the smart speaker to detect keywords and ignore the corresponding commands. In another embodiment, blacklist utilization program 300 utilizes the blacklist file to determine a time restriction on the use of the blacklist file (e.g., the time restriction created in step 208). In another scenario, if blacklist utilization program 300 determines that the run-time of the initiated content is not equal to or greater than the time restriction of the blacklist file, then blacklist utilization program 300 continues to monitor listening device 130 to determine the run-time (i.e., time elapsed) of the initiated content. For example, if blacklist utilization program 300 determines that the audio of a movie has not run longer than the default time restriction (e.g., one hour), then blacklist utilization program 300 continues to monitor the audio of the movie of the DVD player (e.g., client device 120) in the operating environment of the smart speaker (e.g., listening device 130).

In step 314, blacklist utilization program 300 removes the blacklist corresponding to the initiated content from the listening device. More specifically, in response to determining that the initiated content is no longer present in the operating environment of listening device 130 (decision step 308, "YES" branch), blacklist utilization program 300 removes the blacklist corresponding to the initiated content from listening device 130. In one embodiment, blacklist utilization program 300 removes the blacklist file from listening device 130 in response to the removal of the initiated content from client device 120. For example, blacklist utilization program 300 monitors the user interface of the DVD player of the user, detects that the user has given the DVD player the "eject" command, and removes the blacklist file from the smart speaker.

In another embodiment, blacklist utilization program 300 removes the blacklist file from listening device 130 in response to the user no longer accessing the content using client device 120. For example, blacklist utilization program 300 monitors the user interface and web browser of the laptop of the user, detects that the user is logging out of the account used to perform the search query for the product demonstration video, and removes the blacklist file from the smart speaker. In another example, blacklist utilization program 300 monitors the user interface of the DVR of the user, detects that the user has given the DVR the "stop" command, and removes the blacklist file from the smart speaker.

In yet another embodiment, blacklist utilization program 300 removes the blacklist file from listening device 130 in response to the elapsing of time designated in the time limitation of the blacklist file. For example, blacklist utilization program 300 retrieves the one hour default time restriction from the blacklist file, detects the user has initiated the product demonstration video, and removes the blacklist file from the smart speaker after the one hour from user initiation has elapsed. In various embodiments, blacklist utilization program 300 can use multiple indications to determine whether to remove the blacklist file from listening device 130. For example, blacklist utilization program 300 monitors the user interface of the DVR of the user, detects that the user has paused a movie, and determines that the movie is no longer present in the operating environment of the smart speaker. However, blacklist utilization program 300 removes the blacklist file from the smart speaker upon the expiration of the one-hour default time restraint.

Figure 4:
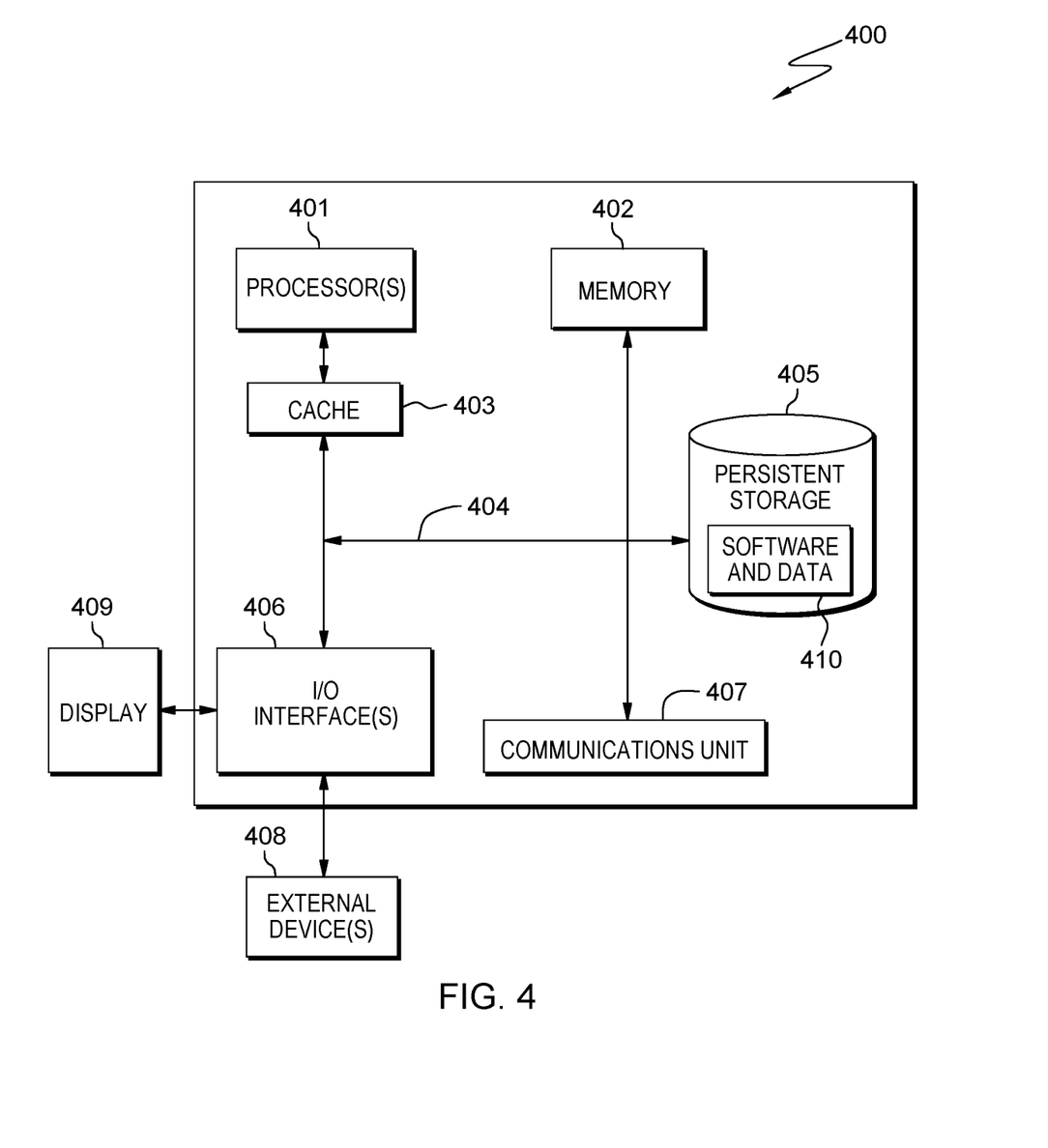
FIG. 4 depicts a block diagram of components of a computing system representative of the client device, listening device, and server of FIG. 1, in accordance with an embodiment of the present invention.

FIG. 4 depicts computer system 400, which is representative of client device 120, listening device 130, and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to listening device 130, software and data 410 includes blacklist utilization program 300. With respect to server 140, software and data 410 includes blacklist generation program 200. With respect to client device 120, software and data 410 includes application 124.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   identifying, by one or more processors, a user input providing a query for digital content;
   identifying, by the one or more processors, a response to the query, the response including one or more digital content items corresponding to the query for the digital content;
   determining, by the one or more processors, at least one keyword included in the one or more digital content items;
   generating, by the one or more processors, a respective customized blacklist of terms for each of the respective one or more digital content items, the respective customized generated blacklists including the determined at least one keyword;
   sending, by the one or more processors, a first respective customized blacklist corresponding to a first digital content item of the respective one or more digital content items to a listening device, wherein the first respective customized blacklist includes an active time length for the first respective customized blacklist based at least in part on a defined time-frame of metadata of the first digital content item; and
   in response to an expiration of the active time length, removing, by the one or more processors, the first respective customized blacklist corresponding to the first digital content item from the listening device.

2. The method of claim 1, wherein determining the at least one keyword included in the one or more digital content items, further comprises:
   identifying, by the one or more processors, at least one trigger word in the one or more digital content items that corresponds to a wake-up command of the listening device;
   identifying, by the one or more processors, words adjacent to the at least one trigger word; and
   determining, by the one or more processors, the at least one keyword included in the one or more digital content items based on the at least one trigger word in the one or more digital content items and the identified words adjacent to the at least one trigger word in the one or more digital content items.

3. The method of claim 1, wherein generating the respective customized blacklist of terms for each of the respective one or more digital content items, further comprises:
   determining, by the one or more processors, a time length of each of the one or more digital content items from metadata of each of the one or more digital content items;
   defining, by the one or more processors, a time-frame that each of the respective customized generated blacklists are active based on the determined time length of each of the one or more digital content items; and
   adding, by the one or more processors, the defined time-frame to each of the respective customized generated blacklists of terms that correspond to each of the one or more digital content items.

4. The method of claim 1, further comprising:
   determining, by the one or more processors, that the user initiates the first digital content item of the one or more digital content items.

5. The method of claim 1, wherein determining the at least one keyword included the one or more digital content items, further comprises:
   in response to receiving the response including the one or more digital content items corresponding to the query for digital content, identifying, by the one or more processors, at least one word in each of the respective one or more digital content items that corresponds to a wake-up command of the listening device.

6. The method of claim 1, wherein generating the respective customized blacklist of terms for each of the one or more digital content items, the respective customized generated blacklists including the determined at least one keyword, further comprises:

adding, by the one or more processors, the determined at least one keyword included in the one or more digital content items to a pre-existing blacklist file associated with the listening device.

7. A computer program product comprising:
one or more computer readable storage media and program instructions stored on the one or more computer readable storage media, the program instructions comprising:
program instructions to identify a user input providing a query for digital content;
program instructions to identify a response to the query, the response including one or more digital content items corresponding to the query for the digital content;
program instructions to determine at least one keyword included in the one or more digital content items;
program instructions to generate a respective customized blacklist of terms for each of the respective one or more digital content items, the respective customized generated blacklists including the determined at least one keyword;
program instructions to send a first respective customized blacklist corresponding to a first digital content item of the respective one or more digital content items to a listening device, wherein the first respective customized blacklist includes an active time length for the first respective customized blacklist based at least in part on a defined time-frame of metadata of the first digital content item; and
in response to an expiration of the active time length, program instructions to remove the first respective customized blacklist corresponding to the first digital content item from the listening device.

8. The computer program product of claim 7, wherein the program instructions to determine the at least one keyword included in the one or more digital content items, further comprise program instructions to:
identify at least one trigger word in the one or more digital content items that corresponds to a wake-up command of the listening device;
identify words adjacent to the at least one trigger word; and
determine the at least one keyword included in the one or more digital content items based on the at least one trigger word in the one or more digital content items and the identified words adjacent to the at least one trigger word in the one or more digital content items.

9. The computer program product of claim 7, wherein the program instructions to generate the respective customized blacklist of terms for each of the respective one or more digital content items, further comprise program instructions to:
determine a time length of each of the one or more digital content items from metadata of each of the one or more digital content items;
define a time-frame that each of the respective customized generated blacklists are active based on the determined time length of each of the one or more digital content items; and
add the defined time-frame to each of the customized generated blacklist of terms that correspond to each of the one or more digital content items.

10. The computer program product of claim 7, further comprising program instructions, stored on the one or more computer readable storage media, to:
determine that the user initiates the first digital content item of the one or more digital content items.

11. The computer program product of claim 7, wherein program instructions to determine the at least one keyword included the one or more digital content items, further comprise program instructions to:
in response to receiving the response including the one or more digital content items corresponding to the query for digital content, identify at least one word in each of the respective one or more digital content items that corresponds to a wake-up command of the listening device.

12. The computer program product of claim 7, wherein program instructions to generate the respective customized blacklist of terms for each of the one or more digital content items, the respective customized generated blacklists including the determined at least one keyword, further comprise program instructions to:
add the determined at least one keyword included in the one or more digital content items to a pre-existing blacklist file associated with the listening device.

13. A computer system comprising:
one or more computer processors;
one or more computer readable storage media; and
program instructions stored on the computer readable storage media for execution by at least one of the one or more processors, the program instructions comprising:
program instructions to identify a user input providing a query for digital content;
program instructions to identify a response to the query, the response including one or more digital content items corresponding to the query for the digital content;
program instructions to determine at least one keyword included in the one or more digital content items;
program instructions to generate a respective customized blacklist of terms for each of the respective one or more digital content items, the respective customized generated blacklists including the determined at least one keyword;
program instructions to send a first respective customized blacklist corresponding to a first digital content item of the respective one or more digital content items to a listening device, wherein the first respective customized blacklist includes an active time length for the first respective customized blacklist based at least in part on a defined time-frame of metadata of the first digital content item; and
in response to an expiration of the active time length, program instructions to remove the first respective customized blacklist corresponding to the first digital content item from the listening device.

14. The computer system of claim 13, wherein program instructions to determine the at least one keyword included in the one or more digital content items, further comprise program instructions to:
identify at least one trigger word in the one or more digital content items that corresponds to a wake-up command of the listening device;
identify words adjacent to the at least one trigger word; and
determine the at least one keyword included in the one or more digital content items based on the at least one trigger word in the one or more digital content items and the identified words adjacent to the at least one trigger word in the one or more digital content items.

15. The computer system of claim 13, wherein the program instructions to generate the respective customized blacklist of terms for each of the respective one or more digital content items, further comprise program instructions to:
- determine a time length of each of the one or more digital content items from metadata of each of the one or more digital content items;
- define a time-frame that each of the respective customized generated blacklist are active based on the determined time length of each of the one or more digital content items; and
- add the defined time-frame to each of the customized generated blacklist of terms that correspond to each of the one or more digital content items.

16. The computer system of claim 13, further comprising program instructions, stored on the computer readable storage media for execution by at least one of the one or more processors, to:
- determine that the user initiates the first digital content item of the one or more digital content items.

17. The computer system of claim 13, wherein the program instructions to determine the at least one keyword included the one or more digital content items, further comprise program instructions to:
- in response to receiving the response including the one or more digital content items corresponding to the query for digital content, identify at least one word in each of the respective one or more digital content items that corresponds to a wake-up command of the listening device.

* * * * *